Feb. 25, 1964
J. W. McDUFFIE ETAL
3,122,091
HAY BALER
Filed April 3, 1963
2 Sheets-Sheet 1
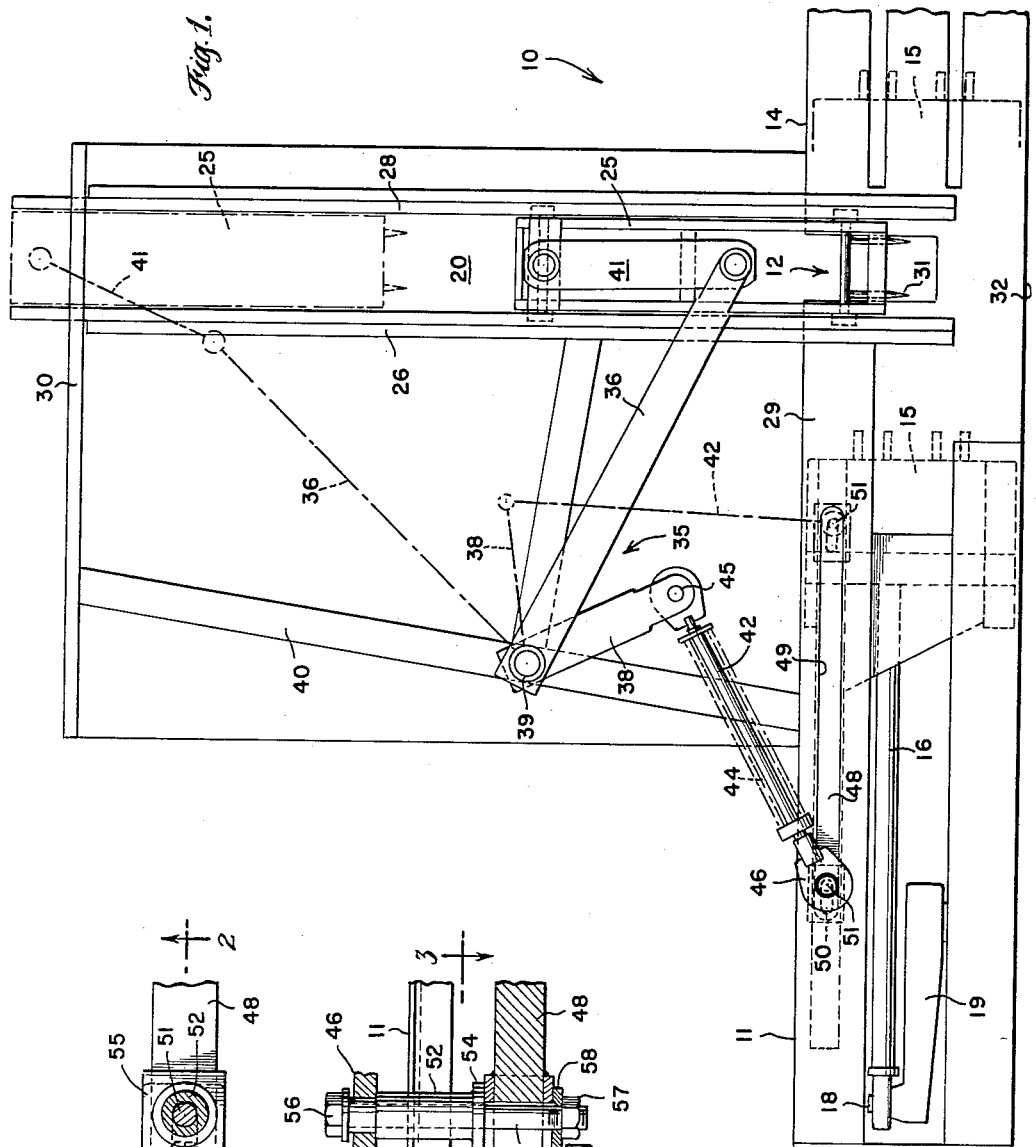
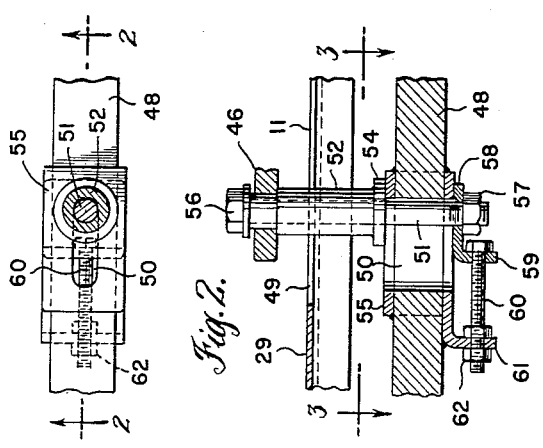
INVENTORS
JAMES W. MC DUFFIE
& EDWIN B. NOLT
BY Joseph A. Brown
ATTORNEY Feb. 25, 1964 J. W. McDUFFIE ETAL 3,122,091
HAY BALER
Filed April 3, 1963 2 Sheets-Sheet 2

INVENTORS
JAMES W. MC DUFFIE
& EDWIN B. NOLT
BY Joseph A. Brown
ATTORNEY

United States Patent Office 3,122,091
Patented Feb. 25, 1964

3,122,091
HAY BALER
James W. McDuffie and Edwin B. Nolt, New Holland, Pa.,
assignors to Sperry Rand Corporation, New Holland,
Pa., a corporation of Delaware
Filed Apr. 3, 1963, Ser. No. 270,222
5 Claims. (Cl. 100—189)

Heretofore, a hay baler has been provided having a bale chamber in which a plunger is reciprocal to compress hay into bales. The bale chamber has an opening in a side wall thereof and the plunger moves from a retracted position forwardly of the opening to an extended position rearwardly of the opening on each working stroke. Hay is delivered to the bale chamber between successive working strokes of the plunger through the side wall opening. A track extends transversely to the bale case and above a hay receiving platform on which hay is deposited from a pickup mechanism. A feeder carriage is operable on the track and provided with depending feed fingers to engage the hay and convey it transversely of the platform and into the bale chamber. The feed fingers stand erect on a feeding stroke and lay back on a return stroke. The carriage travels in a rectilinear direction, perpendicular to the reciprocations of the plunger.

For operating the feeder carriage in precise timed relation with the plunger, the carriage is driven from the plunger. A bell crank is provided and oscillatable about a vertical axis. One leg of the bell crank is connected to the baler plunger to be driven thereby. The opposite leg of the bell crank is connected to the carriage so that when the bell crank is oscillated the feeder carriage is reciprocated. At the end of each working stroke, the feed fingers on the carriage project into the bale chamber. To vary the amount of finger projection into the bale chamber, the feeder carriage is constructed to be extendable and retractable. The problem is that when the carriage is extended to increase the penetration of the feed fingers into the bale chamber, the length of the carriage stroke over the platform is correspondingly decreased whereby somewhat less hay is picked up on each working stroke of the feeder.

A main object of this invention is to provide, in a baler of the character described, adjustability in the feeder drive means whereby the amount of projection of the feed fingers into the bale chamber may be substantially varied but at the same time not materially changing the overall length of a feeding stroke of the feeder carriage over an infeed platform.

Another object of this invention is to provide, in a baler of the character described, an adjustable drive structure whereby desirable infeed characteristics are obtained without corresponding detrimental infeed features.

Another object of this invention is to provide a feeder mechanism of the character described in which the length of each feeding stroke remains substantially constant regardless of adjustments made to vary the projection of the feed fingers into the bale chamber.

A further object of this invention is a provide, in a hay baler of the character described, feeder drive adjustment means which is simply constructed and inexpensive to manufacture and assemble.

A still further object of this invention is to provide an improved drive for a feeder mechanism incorporating adjustment means which positively locks the operative components in a selected adjusted position.

Other objects of this invention will be apparent hereinafter from the specification and from the recital in the appended claims.

In the drawings:

FIG. 1 is a plan view of a hay baler having a feeder mechanism operated by drive means constructed according to this invention, solid line positions showing the feeder carriage at the end of a working stroke and the baler plunger retracted and dotted line positions showing the feed carriage retracted and plunger extended;

FIG. 2 is an enlarged vertical section showing the connection of the drive means to the baler plunger and adjusted to one end of an adjustment location, such view being taken generally on the line 2—2 of FIG. 3;

FIG. 3 is a plan section taken on the line 3—3 of FIG. 2 looking in the direction of the arrows;

Figure 4:
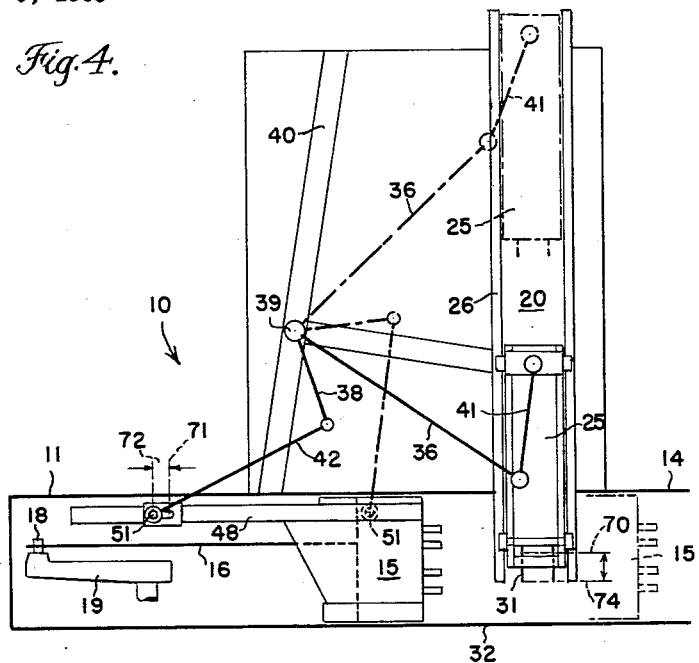
Figure 5:
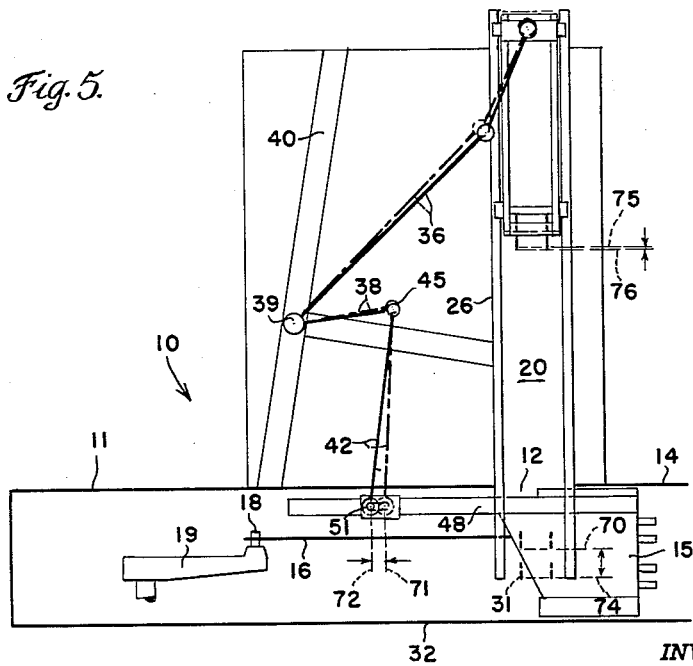

FIG. 4 is a diagrammatic plan view similar to FIG. 1 but on a smaller scale and showing the connection to the plunger adjusted to another position and by dimension lines indicating the variation in projection of the feed fingers into the bale case; and FIG. 5 is a diagrammatic plan view similar to FIG. 4 showing the feeder carriage retracted and the plunger extended, the small variation in the location of the feeder carriage when retracted being indicated relative to the large variation in the projection of the feed fingers into the bale case.

Referring now to the drawings by numerals of reference, and particularly to FIG. 1, 10 denotes a hay baler having a bale chamber 11 provided with a feed opening 12 in a side wall 14 thereof. Suitably supported in bale chamber 11 and reciprocable longitudinally therein is a bale forming plunger 15 which is movable from a retracted position forwardly of the feed opening 12 as shown in solid lines in FIG. 1 to an extended position rearwardly of the opening as indicated in dotted lines. The plunger is reciprocated by means of a connecting rod 16 pivotally connected at 18 to a crank arm 19. The crank arm 19 is rotated from a suitable source of power, not shown, such as connection to the tractor which tows the baler.

Extending laterally from side wall 14 of bale case 11 is a hay receiving platform 20 disposed in a horizontal plane substantially in register with the lower portion of the feed opening 12. Hay is adapted to be picked up from the ground by means of a pickup mechanism, not shown, and delivered to platform 20.

Hay deposited on platform 20 is adapted to be fed into bale chamber 11 by a feeder mechanism comprising a carriage 25 reciprocable over a track 26. Track 26 comprises spaced apart rails 28 which extend parallel to each other and transverse to the extension of bale case 11 and the direction of reciprocation of plunger 15. At one end of track 26, the rails 28 are mounted on and supported by the top wall 29 of bale chamber 11. The opposite ends of the rails are supported on an upright wall 30. Wall 30 is laterally spaced from bale chamber wall 14 to provide an open area on the platform 20 for the reception of hay. Carriage 25 reciprocates rectilinearly along track 26 and sweeps hay deposited on the platform 20 into bale chamber 11. The carriage has depending feed fingers 31 which stand erect on a feeding stroke of the carriage and lay back on a return stroke. Such arrangement is conventional with rectilinear feeders of this type. At the end of a feeding stroke, as shown on solid lines in FIG. 1, the feed fingers 31 project into the bale case 11 and they are located substantially past side wall 14. Hay delivered into the bale case is compressed between fingers 31 and the other side wall 32 of the bale chamber.

For reciprocating carriage 25, a drive is provided comprising a bell crank 35 having a first leg 36 and a second leg 38. A bearing support 39 is provided for the bell crank on transverse brace 40 spaced vertically from the platform 20. Bearing 39 provides a vertical axis about which bell crank 35 is oscillatable. The first leg 36 of the bell crank is connected to the carriage 25 by a first link 41. One end of the link is pivotally connected to leg 36 and the opposite end is pivotally connected to carriage 25. The second leg 38 of the bell crank is connected to plunger 15 by a second link 42. Link 42 comprises a pair of telescopic extendable and contractable members held in the position shown in FIG. 1 by springs 44 diagrammatically illustrated. One end of second link 42 is pivotally connected at 45 to bell crank leg 38. The opposite end 46 of the second link is pivotally connected to a rearward extension 48 of plunger 15. Bale case top wall 29 has a slot 49 in vertical register with extension 48. The extension 48 is located adjacent side wall 14 of bale chamber 11. The connection to the plunger is provided by means shown best in FIGS. 2 and 3.

The extension 48 is provided with an elongated slot 50 through which a pin 51 extends vertically. A sleeve 52 surrounds pin 51 and has a flange 54 slidably seated on bearing plate 55. The end 46 of second link 42 is mounted on pin 51 and abuts against the upper end of sleeve 52, being held in place by the head 56 of the pin. At its lower end, pin 51 projects through an L-shaped bracket 58 and it is connected thereto by nut 57. Bracket 58 is slidable relative to plunger extension 48, having a leg 59 connected by a bolt 60 to a flanged plate 61 affixed to and projecting from plunger extension 48. A pair of lock nuts 62 are provided on bolt 60 as shown. By adjusting bolt 60, pin 51 may be adjusted along elongated slot 50 from the position shown in FIG. 2 to the position shown in FIG. 4 or any intermediate position. The threads on the bolt 60 provide an infinitely variable adjustment. As will be noted, the extension of the slot 50 is parallel to the direction of reciprocation of the plunger 15. The connecting means provides for the adjustment of pin 51 relative to the plunger extension 48 and produces a result which can be best seen from FIGS. 1, 4 and 5.

When pin 51 is adjusted to the rearward end of slot 50, FIG. 1, the fingers 31 stop at the end of a working stroke of carriage 25 in a position wherein they project into the bale case as shown in FIG. 1 and indicated by the dimension line 70 in FIGS. 4 and 5. The position of pin 51 is shown at 71 in FIGS. 4 and 5. When pin 51 is adjusted forwardly to the opposite end of slot 50 to the position shown at line 72, the projection of the fingers 31 at the end of a working stroke of a carriage 25 is to the line 74. It will be seen that a given adjustment of the pin 51 produces a much larger adjustment of the projection of fingers 31 into bale case 11 and past side wall 14.

While the adjustment of the pin 51 produces a substantial variation in the projection of the fingers 31 into the bale case 14, the relative lengths and locations of the drive legs and links is such that a very small change in the overall stroke of the feeder carriage over the platform 20 results. As shown in FIG. 5, when feeder carriage 25 is retracted, fingers 31 are located in substantially the same position regardless of the adjustment of the pin 51. In one position of adjustment of the pin 51 at the rearward end of slot 50, feed fingers 31 when retracted move to the dotted line location 75; and when pin 51 has been adjusted to the opposite or forward end of slot 50 the fingers move to the location 76. Thus, the distance from feed fingers 31 when retracted to bale case side wall 14 remains substantially constant regardless of the adjustment employed at the pin 51. At the same time, a very substantial variation of the projection of the fingers 31 into the bale case 14 at the end of a working stroke is provided by adjusting pin 51. This result is highly advantageous because variations in finger projection into the bale case can be obtained without affecting the overall stroke of the feeder carriage over the platform 20. If for example the feeder carriage is adjusted to have the fingers 31 project into the bale case 14 an additional four inches, and then the feeder carriage had a working stroke over platform 20 four inches shorter than normal, what would be gained at one end of the feed stroke would be lost at the opposite end. However, with the present design substantial gains are obtained at one end of the stroke without a corresponding loss at the opposite end.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A hay baler comprising a bale chamber having a feed opening in one side wall thereof, a plunger reciprocal in said bale chamber from a retracted position forwardly of said opening to an extended position rearwardly thereof, a hay receiving platform extending laterally from said one side wall, a track mounted above said platform and extending transverse to said bale chamber and to the direction of reciprocation of said plunger, a feeder carriage mounted on said track and movable rectilinearly thereover toward and away from said bale chamber, hay engageable feed fingers depending from said carriage and located to project past said one side wall and into said bale chamber when said carriage is at the end of a feeding stroke and hay delivered by said feed fingers being compressed between the fingers and the other bale chamber side wall, a bell crank mounted along said one bale chamber side wall and vertically spaced from said platform, said bell crank being oscillatable about a vertical axis and having a first leg and a second leg, a first link having one end pivotally connected to said first leg and an opposite end pivotally connected to said carriage, a second link having one end pivotally connected to said second leg, a pivot pin, means connecting said pivot pin to said plunger for selective adjustment relative thereto and for locking the pin in adjusted position, and means pivotally connecting the opposite end of said second link to said pivot pin, the relationship of said bell crank legs and said links being such that an adjustment of said pin relative to said plunger produces a substantial change in the amount of projection of said feed fingers into said bale chamber at the end of a feeding stroke of said carriage and a much smaller relative change in the location of the feed fingers to the bale chamber when the carriage is at the end of a return stroke whereby a substantial change may be made in the projection of said fingers into said bale chamber accompanied by a much smaller change in travel of the fingers over said platform.

2. A hay baler as recited in claim 1 wherein the adjustment of said pin relative to said plunger is in a direction parallel to the reciprocation of the plunger, an adjustment of said pin of a given amount producing a relatively large adjustment in the location of said feed fingers at the end of a working stroke.

3. A hay baler as recited in claim 2 wherein said plunger has a slot elongated in a direction parallel to the reciprocation of the plunger and said pin extending vertically through said slot and through the top of said bale chamber.

4. A hay baler as recited in claim 2 wherein bearing means is provided to maintain the verticality of said pin regardless of the position of adjustment of the pin.

5. A hay baler comprising a bale chamber having a feed opening in one side wall thereof, a plunger reciprocal in said bale chamber from a retracted position forwardly of said opening to an extended position rearwardly thereof, a hay receiving platform extending laterally from said one side wall, a track mounted above said platform and extending transverse to said bale chamber and to the direction of reciprocation of said plunger, a feeder carriage mounted on said track and movable rectilinearly thereover toward and away from said bale chamber, hay engageable feed fingers depending from said carriage and located to project past said one side wall and into said bale chamber when said carriage is at the end of a feeding stroke and hay delivered by said feed fingers being compressed between the fingers and the other bale chamber side wall, a bell crank mounted along said one bale chamber side wall and vertically spaced from said platform, said bell crank being oscillatable about a vertical axis and having a first leg and a second leg, a link having one end pivotally connected to said first leg and an opposite end pivotally connected to said carriage, a pivot pin, means connecting said pivot pin to said plunger for selective adjustment relative thereto and for locking the pin in adjusted position, and means pivotally connecting said pivot pin and said second leg adjacent a terminal position of the leg and at a point substantially spaced radially from said pivot axis, the relationship of said bell crank legs, said link and said last named connecting means being such that an adjustment of said pin relative to said plunger produces a substantial change in the amount of projection of said feed fingers into said bale chamber at the end of a feeding stroke of said carriage and a much smaller relative change in the location of the feed fingers to the bale chamber when the carriage is at the end of a return stroke whereby a substantial change may be made in the projection of said fingers into said bale chamber accompanied by a much smaller change in travel of the fingers over said platform.

References Cited in the file of this patent

UNITED STATES PATENTS

| | | |
|---|---|---|
| 2,854,809 | Starrett et al. | Oct. 7, 1958 |
| 2,884,850 | Nolt | May 5, 1959 |
| 2,926,601 | Tarbox et al. | Mar. 1, 1960 |
| 3,040,508 | Nolt et al. | June 26, 1962 |

FOREIGN PATENTS

| | | |
|---|---|---|
| 649,640 | Germany | Aug. 28, 1937 |